June 15, 1965 D. M. WILLYOUNG 3,189,769
DYNAMOELECTRIC MACHINE ROTOR COOLING
Filed Aug. 1, 1961 2 Sheets-Sheet 1
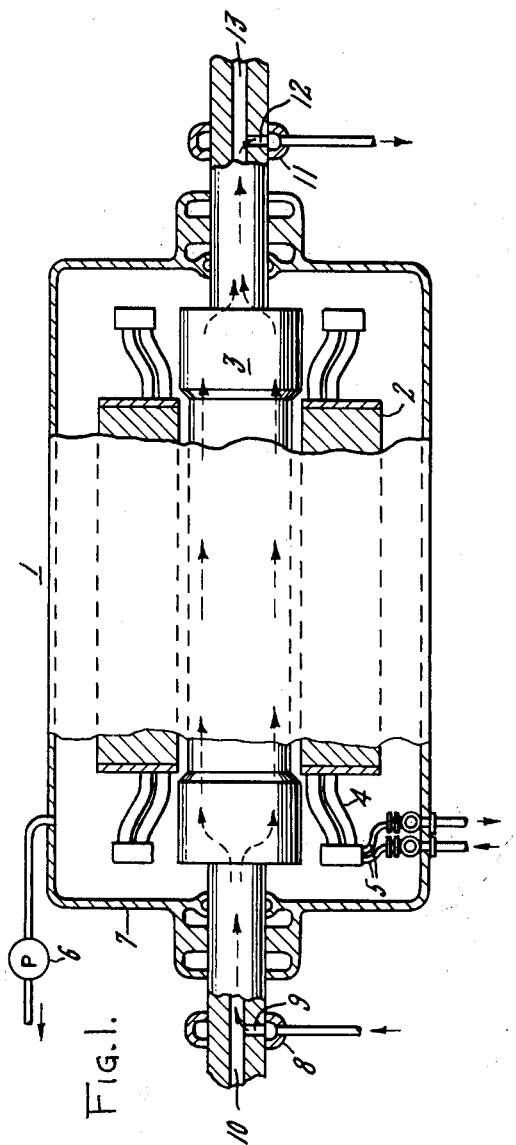
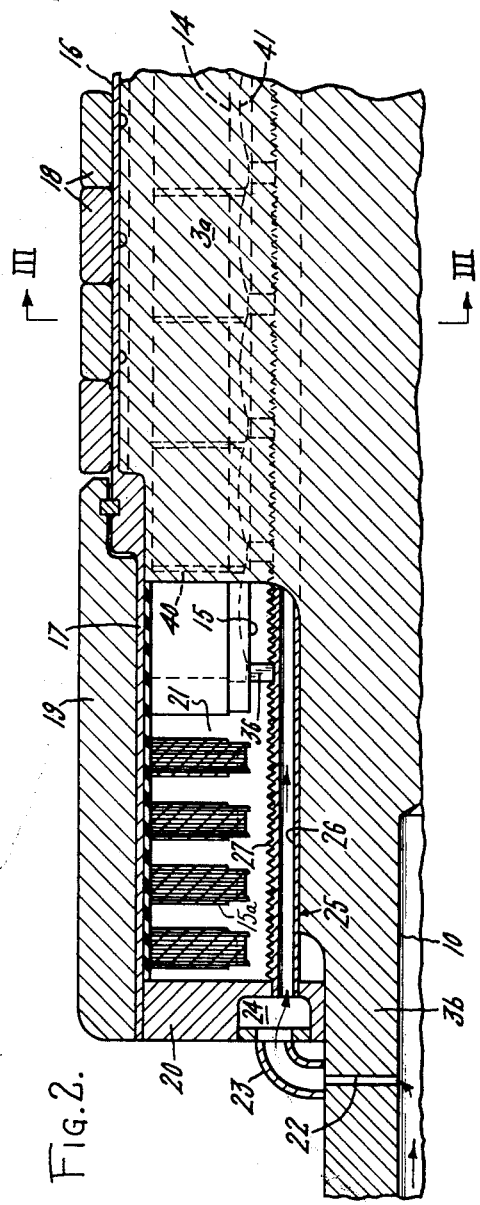
INVENTOR.
DAVID M. WILLYOUNG
BY
HIS ATTORNEY INVENTOR.
DAVID M. WILLYOUNG
BY W. C. Crutcher
HIS ATTORNEY ID # United States Patent Office 3,189,769
Patented June 15, 1965

3,189,769
DYNAMOELECTRIC MACHINE ROTOR COOLING
David M. Willyoung, Scotia, N.Y., assignor to General Electric Company, a corporation of New York
Filed Aug. 1, 1961, Ser. No. 128,438
6 Claims. (Cl. 310—52)

This invention relates to an improved arrangement for cooling a dynamoelectric machine rotor, and more particularly to an arrangement for cooling the rotor windings with a vaporizable dielectric fluid while using a secondary heat exchange fluid to conduct heat to and from the rotor.

It is well known that the windings of dynamoelectric machines or transformers can be cooled by causing a vaporizable dielectric fluid to vaporize on the windings so that the latent heat required to vaporize the fluid will be taken from the windings. It is also known that dynamoelectric machine rotor and stator windings can be cooled by vaporizing a dielectric fluid in more or less direct intimate thermal contact with the windings and that the vapor can then be condensed to a liquid or compressed, cooled and recirculated. All of these schemes require that the dielectric fluid pass through external piping, pumps and other equipment, introducing the possibilities of leakage and loss of fluid. In order to introduce the vaporizable fluid directly into the windings or into ducts inside the main insulation, insulated pipe connections are often needed. Thermal expansion of the windings then can cause leakage and usually necessitates flexible connections. Cooling a rotating member with a vaporizable fluid is a particularly difficut problem, since the pressures are very high due to centrifugal force, and many opportunities for leakage and loss of the dielectric fluid are presented when entering and leaving the rotor. The dielectric qualities of the fluid must be maintained despite the possibilities of contamination in the external recirculation system.

Accordingly, one object of the present invention is to provide an improved dynamoelectric machine rotor in which the windings are cooled by a vaporizable fluid in substantially direct thermal contact with the windings.

Another object of the invention is to provide a rotor in which the heat can be removed from the windings by a secondary fluid which is much less restricted as to properties such as dielectric qualities, cleanliness, etc.

Another object of the invention is to provide a rotor cooling arrangement for removing much larger quantities of heat from the windings than with previous arrangements, thereby giving greater capability for the dynamoelectric machine.

Still another object of the invention is to provide an improved vapor-cooled rotor winding which does not require a pump to recirculate the vapor.

Yet another object of the invention is to provide an improved rotor winding arrangement which is particularly suitable for cooling by vaporization.

A more specific object of the invention is to provide a cooling arrangement for a dynamoelectric machine rotor wherein a first dielectric vaporizable fluid acts as a thermal coupling between the winding and a heat exchanger located on the rotor and wherein a secondary fluid circulated through the heat exchanger carries heat away from the rotor.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a schematic view, partly in section, of a dynamoelectric machine;

FIG. 2 is an enlarged view, in section, of a portion of the rotor of FIG. 1 taken at the junction of the spindle portion with the body portion of the rotor;

Figure 3:
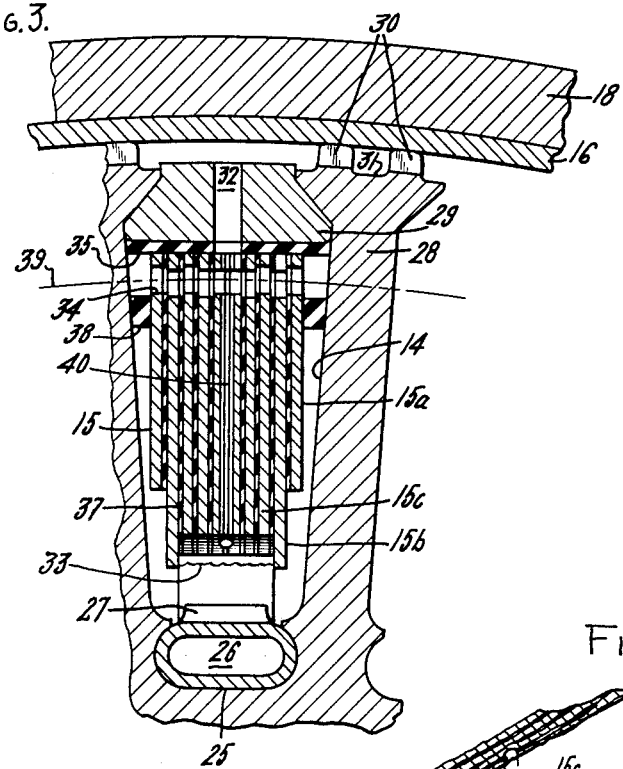
FIG. 3 is a further enlarged detail view of the slot cross-section taken along lines III—III in FIG. 2.

Briefly stated, the invention is practiced by providing a hermetically sealed rotor enclosure containing windings, a dielectric vaporizable fluid, and a heat exchanger. External means are provided to circulate a secondary coolant fluid through the heat exchanger. The windings and the heat exchanger are so located that the centrifugal force field caused by rotation of the rotor greatly accelerates the boiling and condensation processes and provides circulation of the vapor.

Referring now to FIG. 1 of the drawing, a dynamoelectric machine 1 comprises a stator 2 and a rotor 3. The stator windings 4 are preferably, but not necessarily, cooled by liquid circulated through insulating pipes 5 supplied from an external recirculating and cooling source (not shown). A suction pump 6 of any suitable type may be employed to evacuate a gas-tight casing 7 containing the rotor and stator so as to remove any vapor in casing 7 and to reduce "windage losses'" of the rotor.

Means are supplied to conduct a cooling fluid to rotor 3 shown diagrammatically here as an annular inlet chamber 8 supplying liquid through the radial passage 9 to the bore hole 10, both defined by the rotor spindle. Similar means are shown for withdrawing the spent coolant at the other end of the rotor, such as annular outlet chamber 11, passage 12, and bore hole 13.

A secondary coolant fluid is introduced to annular chamber 8 from a source of fluid under pressure (not shown), and the spent coolant is discharged to a waste disposal, or is cooled and recirculated, this depending on the coolant chosen and being immaterial to the present invention. The secondary coolant fluid is preferably liquid and it is unrestricted as to properties as long as it is a suitable heat exchange medium. It may be tap water, turbine condensate, river water, or bearing oil.

As noted on FIG. 1, the rotor is hermetically sealed and one method for accomplishing this is pointed out more clearly by reference to FIG. 2, in which a portion of the rotor 3 is shown at the junction of the body portion 3a and the rotor spindle portion 3b. The body portion 3a defines a number of circumferentially spaced longitudinal slots 14 in which are disposed windings 15 having end turn portions 15a.

One method of hermetically sealing the rotor windings in a hermetically sealed chamber is illustrated in FIG. 3, but it is to be understood that many other methods are suitable for providing a hermetically sealed rotor. The arrangement shown here is as described in U.S. Patent 3,049,633 issued to Bernard M. Cain on August 14, 1962. Also, the type of rotor winding disclosed herein, which is particularly suitable for the invention is substantially as disclosed in U.S. Patent 3,098,941 issued to David M. Willyoung on February 4, 1964. Both of the above are assigned to the assignee of the present application. It is to be understood that the illustrated type of hermetically sealed rotor enclosure and the illustrated type of rotor winding arrangement are employed for the purpose of describing the invention, and that the invention could equally well be used with other types of hermetically sealed rotor enclosures and with other types of winding arrangements.

A thin liquid-tight cylinder 16 encloses the entire rotor body portion 3a and is connected by welding to another "stepped" liquid-tight cylinder 17 which encloses the end turn portion 15a of the winding. Liquid-tight cylinder 16 is backed up by a number of body rings 18; and similarly the liquid-tight cylinder 17 and the end turn portions 15a of the winding are held in place by a heavy retaining ring 19. The end turn liquid-tight cylinder 17 is sealed to a heavy centering ring 20, which in turn is sealed to rotor spindle 3b. Thus, on rotor 3, a hermetically sealed chamber 21 is defined by rotor 3, centering ring 20, cylinder 17, body cylinder 16, and similar components at the other end of the rotor (not shown). Electrical connections passing through suitable hermetic seals (not shown) are, of course, needed to connect the winding 15 to an external source. These are not shown, as they would only tend to confuse the true invention.

The secondary coolant liquid is supplied from bore hole 10 through a plurality of radial passages 22 and connecting pipes 23 to an annular cavity 24 defined by the centering ring 20. Connected to the annular cavity 24 are a number of circumferentially spaced, axially extending heat exchange elements 25 defining passages 26 connected with the centering ring cavity 24 and also defining radially directed, transversely extending fins 27 which serve as the condensing surfaces for the dielectric vapor. Heat exchange elements 25 extend from the centering ring 20 and lie along the bottom of each slot 14, as may be seen by reference to FIG. 3 of the drawing.

The cross-sectional view of FIG. 3 shows that slots 14 are cut between rotor teeth 28, and that winding 15 is held in place by a dovetail wedge member 29 abutting against the outer parts of rotor teeth 28. Rotor teeth 28 also define at the outermost parts thereof both circumferential grooves 30 and axial grooves 31, so that liquid can circulate freely and distribute itself around the rotor periphery immediately inside the liquid-tight cylinder 16. It should also be noted that wedge 29 defines a number of axially spaced radial ports 32 which allow free access of liquid from rotor slot 14 to the space between the rotor body 3a and cylinder 16.

Rotor winding 15, as illustrated in the preferred embodiment, comprises a number of edge-standing conductors 15a, 15b, 15c, etc. It should be noted that the inside conductors 15c are altered in radial height near the bottom of the slot so as to define a pocket 33 radially outward of fins 27 on the heat exchanger element 25. These edge-standing conductors 15a–15c are insulated from one another by thin insulating strips 34 and also define longitudinally spaced aligned holes 34 near the radially outermost parts of the conductors. Windings 15 are held radially in the slot between insulating blocking members 35 at the top and longitudinally spaced blocks 36 at the bottom. Windings 15 are also transversely restrained between insulating blocks 38 at the sides of the winding.

The vaporizable dielectric fluid selected to fill the rotor enclosure may be one of many commercial obtainable products. The requirements are that the selected fluid be essentially inert, non-toxic, and non-inflammable with a good thermal conductivity. Furthermore, the fluid should be compatible with the rotor insulation used so that it will not form gases. One of the most important factors is the boiling point. When a fluid in a saturated state is sealed in a container, and subjected to different ambient temperatures, the vapor pressure will depend upon the ambient temperature. Since a rotor may be subjected to a fairly large range of ambient temperatures varying from a possible very cold temperature, when the rotor is first being shipped, to a fairly high temperature, which represents the maximum desired operating temperature of the windings, the pressure inside the hermetically sealed rotor will also cover a wide range. Depending on the boiling point of the fluid selected, it is possible that the interior of the rotor will be subjected to a partial vacuum at low temperatures and to above atmospheric pressure at higher temperatures. Therefore, the type of hermically sealed container must be designed with this fact in mind.

Suitable dielectric fluids are commercially obtainable. One class of commercial products is the Freons, manufactured by Du Pont de Nemours & Company, and two of these Freons having particularly suitable qualities are Freon-113 with a boiling point of 47.6° C. at one atmosphere of pressure and Freon-114 with a boiling point of 3.5° C. at one atmosphere. Another dielectric vaporizable coolant which may be satisfactory is FC-75 manufactured by Minnesota Mining & Manufacturing Company, having a boiling point of 101° C. at one atmosphere. The selection of a proper fluid must be made with due regard to its thermodynamic, electrical, and chemical properties.

Slot 14 is filled with dielectric vaporizable fluid which is partially in the liquid state. The fluid is so selected and the rotor filled at such a pressure that the proportion of liquid to vapor will be such as to form a vapor-liquid interface in the neighborhood of dot-dash line 39, when the rotor is turning and the liquid is pressed to the radially outermost parts of the rotor by centrifugal force. It will be noted that the interface 39 is approximately at the midpoint of holes 34 so that the liquid can circulate transversely across the slot 14. A series of radial overflow passages 40 connect the pockets 33 with aligned holes 34, so that liquid can flow radially to the vapor-liquid interface 39.

Figure 4:
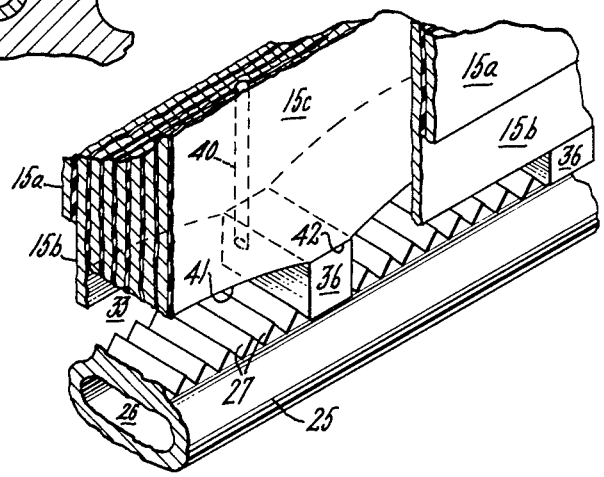
FIG. 4 is an enlarged perspective view showing the details in the bottom of the slot of FIG. 3.

The details of the manner of providing pockets 33 and the arrangement at the bottom of the slot are better seen by reference to FIG. 4 of the drawing, in which it may be seen that the intermediate conductors 15c define on their lower edges a series of spaced arcuate cutouts 41 joined by flat portions 42. Flat portions 42 rest on the insulating blocks 36 disposed between winding 15 and heat exchanger 25. The longer side conductors 15b define, together with the arcuate portions 41, a series of longitudinally spaced pockets 33. It will be noted that pockets 33 are cupped radially inward and directly above the fins 27 on the heat exchanger element 25. Therefore, any condensed liquid on fins 27 will be thrown radially outward by the rotation of the rotor, collected in pockets 33, whence it drains radially outward through overflow passages 40.

If desired, the blocks 36 can be extended to the sides of the slot so as to partially block off longitudinal flow of vapor from one pocket 33 to the next. This longitudinal flow of vapor could take place if one end of the condenser 46 were colder than the other. Throttling the longitudinal flow will cause the pressure to vary slightly from one pocket 33 to the next.

Figure 5:
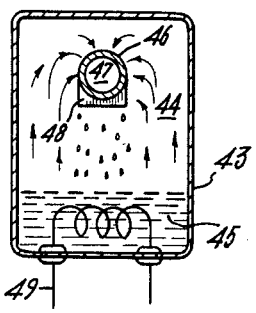
FIG. 5 is an idealized schematic drawing illustrating the principle of operation.

Reference to the idealized drawing of FIG. 5 illustrates a hermetically sealed container 43 containing a vaporizable dielectric fluid having a vaporous portion 44 and a liquid portion 45. Located in the vaporous portion 44 is a condenser 46 (corresponding to heat exchanger 25 on the rotor), defining a passage 47 for condenser cooling fluid and a fin 48. Disposed in liquid portion 45 is an electrical winding 49 (corresponding to winding 15 on the rotor) which evolves heat due to the ohmic losses therein.

The method of operation of the invention will first be described by reference to FIG. 5. There it is understood that the liquid portion 45 is in the bottom due to gravity, but in the rotor the liquid portion will be in the radially outermost portions of the rotor or in any pockets which catch the liquid. It will be appreciated that if the desired operating temperature of the winding 49 is greater than the saturation temperature of the dielectric fluid at the particular pressure that it happens to be in the hermetically sealed container 43, then the temperature difference will cause the liquid portion to vaporize and tend to increase the vapor pressure. It will also be noted that if a coolant is circulating through passage 47 at a temperature lower than the saturation temperature at the particular pressure at which the hermetically sealed container happens to be, then vapor will condense on fins 48 and drip back to the liquid portion 45. It will further be appreciated that an equilibrium will obtain between the condensing vapor and the vaporizing liquid so that the weight of liquid vaporized exactly equals the weight of vapor condensed in a given period of time. It should also be apparent that the condensation and vaporization do not, in themselves, add or subtract latent heat, since they cancel one another. Therefore, the vapor acts as a "thermal coupling" between the condenser 46 and the electrical element 49. The amount of heat generated due to ohmic losses in the element 49 equals the amount of heat carried away by the coolant in passage 47.

Departing from the idealized drawing of FIG. 5 and returning to the dynamoelectric machine rotor, it will be appreciated that the same situation takes place as though the hermetic container 43 of FIG. 5 were whirled rapidly around an axis at the top of the drawing. Thus, instead of the acceleration to which the masses are subjected being that of gravity, the acceleration is that of a rotating body or $\omega^2 r$, which is many times that of gravity. This subjection of the condensation and boiling processes to an increased acceleration aids both the condensing process by increasing the rate of removal of the condensate from the fins, and aids the vaporization process by increasing the buoyancy of the bubbles. Since both vaporization and condensation take place at an accelerated rate, the capacity of the system for heat removal is much greater than conventional stationary vaporization cooling systems. For example, for a typical large diameter 3600 r.p.m. rotor for a turbine generator, analysis and published experimental data indicate that these phenomena may be 8 to 10 times as effective as in the usual one "g" acceleration field.

With reference to FIGS. 3 and 4 of the drawing, it will be seen that the edge-standing windings consisting of elements 15a, 15b, 15c, etc., are ideal for this application since each conductor of the winding is immersed in boiling liquid (above interface 39) so that the heat from the non-immersed portions of the winding can be transmitted radially through the winding copper rather than through the less conductive vapor. In order to prevent an excessive thermal gradient in a radial direction along each winding conductor, the pockets 33 in the radially innermost part of the winding are employed to catch most of the liquid flung off from fins 27 of the condenser and to boil there on the innermost part of the winding so that cooling takes place both on the radially innermost and the radially outermost part of each conductor. The overflow passage 40 drains coolant continuously from pocket 33 to the liquid interface 39. The liquid is, of course, distributed uniformly around the rotor periphery by virtue of radial holes 32 in the wedges, and the axial and circumferential grooves 31, 30 respectively in the rotor teeth.

Since the dielectric fluid is sealed in a hermetically sealed rotor, there is no fear of contamination or loss in an outside circulating system. There is no pumping required between condensate and vaporizing surface as with most vaporization cooling schemes, since the rotation of the rotor automatically throws the condensate back out to the places where it will vaporize to cool the winding. The natural convection of the vapor serves to carry the vapor radially inward where it is recondensed.

Analysis indicates that the increased "gravitational" forces due to the high speed rotation have a substantial effect in increasing the cooling capacity of the system. Also, since the latent heat of such a fluid requires a great many B.t.u.'s to change the state of the fluid for a given quantity of fluid, only a very small quantity of dielectric fluid is needed. For example, on a high capability rotor of the design shown (for instance, as might be used in a 500 mw. generator), the liquid depth measured in radial thickness need only be about two inches or so, the remainder of the cooling passages being filled with vapor. Hence, the increased stresses on the retaining rings and body rings, due to the added liquid, as compared to a rotor containing no liquid, are not substantial.

Since the secondary liquid used as a coolant in the condenser tubes is isolated from the winding members, any coolant having good heat exchange ability can be used, even though its insulating ability may be poor and despite the fact that it may not be of high purity. Although a very close "thermal coupling" exists between the secondary liquid in the condenser 25 and the dielectric vapor condensing on the windings, the two are not in actual contact of any kind.

It is, of course, within the province of the invention to arrange the windings in many other fashions, defining suitable pockets to catch the condensate thrown radially outward so that boiling will take place in these pockets and thus distribute the cooling throughout the winding. Although "edgewise windings" are shown as preferable, the invention is not limited to use with such conductors, and boiling may take place at different radial levels on the winding as desired, by the use of suitably disposed "catching pockets."

It is desired to cover in the appended claims all such modifications as come within the true spirit and scope of the invention.

What I claim as new and desire to secure by Letters Patent of the United States is:

1. In a dynamoelectric machine, the combination of a rotor defining a rotating substantially gas-tight chamber, an operatively connected electrical winding disposed in said chamber and having portions located in the radially outermost parts thereof, said chamber also containing a dielectric vaporizable fluid partially in a liquid state, rotating heat exchanger means disposed in said chamber and having portions located in a radially inner part thereof, and means circulating a secondary coolant fluid through said heat exchanger means at a temperature lower than the prevailing saturation temperature of said dielectric fluid, whereby the dielectric fluid acts as a thermal coupling between the winding and the heat exchanger to transfer heat evolved due to ohmic losses in the winding by boiling on the winding and condensing on the heat exchanger means.

2. In a dynamoelectric machine, the combination of a rotor defining a rotating hermetically sealed chamber, an operatively connected electrical winding disposed in said chamber, said chamber also containing a dielectric vaporizable fluid partially in a liquid state, having a boiling temperature at prevailing chamber pressure which is lower than the desired operating temperature of said winding, heat exchanger means defining condensing surfaces disposed in a radially inner part of said chamber and constructed to rotate therewith, and means for circulating a secondary liquid coolant through said heat exchanger means at a temperature lower than the saturation temperature at prevailing chamber pressure of said dielectric fluid, whereby the dielectric fluid transfers heat evolved from the winding to the heat exchanger means by boiling on the winding and condensing on the heat exchanger means.

3. The combination according to claim 2 wherein said winding includes outer portions disposed in the radially outermost sections of said chamber and also defines inner pockets in locations radially spaced from said outer portions aligned with and radially outward of said heat exchanger means, whereby condensed dielectric liquid will be held by centrifugal force to boil on both said outer portions and in said inner pockets of the winding so as to reduce radial thermal gradients through the winding.

4. In a dynamoelectric machine, the combination of a rotor defining a rotating hermetically sealed chamber, an operatively connected electrical winding disposed in said chamber, said chamber also containing a dielectric vaporizable fluid partially in a liquid state having a saturation temperature at prevailing chamber pressure which is lower than the desired operating temperature of said winding, heat exchanger means disposed in a radially innermost portion of said chamber and having radially extending fin members, means for circulating a secondary coolant fluid through said heat exchanger means at a temperature lower than the saturation temperature at prevailing chamber pressure of said dielectric fluid, said winding defining inner pockets aligned with and radially outward of said fin members and also defining radial passages connecting said pockets with radially outer portions of the winding, whereby the dielectric fluid will condense on said heat exchanger fin members and be thrown by the fins to said pockets, and flow from said pockets through said radial passages.

5. In a dynamoelectric machine, the combination of a rotor defining circumferentially spaced longitudinal slots, a plurality of lightly insulated electrical conductors disposed in said slots and connected at the end of the rotor by end turn portions, means hermetically sealing said rotor winding in a liquid-tight chamber, said chamber also containing a dielectric vaporizable fluid partially in a liquid state, a plurality of heat exchanger tubes each disposed in the bottom of a said longitudinal slot and defining radially extending fins, means for circulating a coolant liquid through said heat exchanger tubes at a temperature lower than the saturation temperature at prevailing chamber pressure of said dielectric fluid, whereby the dielectric fluid acts as a thermal coupling between the winding and the heat exchanger tubes by boiling on the winding and condensing on the heat exchanger fins.

6. The combination according to claim 5 wherein said electrical conductors are disposed on edge in said slot and extend substantially the full radial depth of said slot, whereby at least one edge of each conductor in the slot is immersed in the liquid phase of said dielectric fluid.

References Cited by the Examiner
UNITED STATES PATENTS

| 2,780,737 | 2/57 | Labastie | 310—61 |
| 2,898,484 | 8/59 | Krastchew | 310—52 |
| 2,903,609 | 9/59 | Waddington | 310—64 |
| 3,009,072 | 11/61 | Mossay | 310—64 X |

OTHER REFERENCES

German printed application, S 30377 VIIIb/21d', March 22, 1956.

MILTON O. HIRSHFIELD, *Primary Examiner.*

DAVID X. SLINEY, *Examiner.*